United States Patent [19]
Fish

[11] Patent Number: 5,465,647
[45] Date of Patent: Nov. 14, 1995

[54] FLUID CYLINDER END CAP ASSEMBLY

[75] Inventor: Elson B. Fish, Lakeville, Ind.

[73] Assignee: Polygon Company, Walkerton, Ind.

[21] Appl. No.: 338,037

[22] Filed: Nov. 14, 1994

[51] Int. Cl.⁶ .................................................. F01B 29/00
[52] U.S. Cl. .............................. 92/128; 92/168; 92/169.1; 92/170.1; 29/888.06; 29/453; 403/319
[58] Field of Search ............................ 92/169.1, 170.1, 92/164, 128, 168; 29/507, 523, 888.06, 453, 525, 451, 525.1; 403/289, 290, 326, 315, 316, 319

[56] References Cited

U.S. PATENT DOCUMENTS

| | | |
|---|---|---|
| 2,155,180 | 4/1939 | Caldwell . |
| 2,234,142 | 3/1941 | Janney et al. . |
| 2,413,115 | 12/1946 | Sheehan . |
| 2,832,130 | 4/1958 | Harvey ........................................ 29/507 |
| 4,073,047 | 2/1978 | Fishbaugh et al. . |
| 4,452,128 | 6/1984 | Stoll ........................................ 92/170.1 |
| 4,531,452 | 7/1985 | Spielmann et al. ..................... 403/326 |
| 4,532,856 | 8/1985 | Taylor . |
| 4,663,819 | 5/1987 | Traylor . |
| 4,779,902 | 10/1988 | Lee . |
| 4,783,897 | 11/1988 | Basnett . |
| 4,930,204 | 6/1990 | Schurter . |
| 5,015,014 | 5/1991 | Sweeney ..................................... 29/453 |
| 5,123,677 | 6/1992 | Kreczko et al. . |
| 5,127,157 | 7/1992 | Oetiker ...................................... 29/523 |
| 5,155,892 | 10/1992 | King . |
| 5,184,391 | 2/1993 | Fisk et al. . |
| 5,219,373 | 6/1993 | Hatakeyama et al. . |
| 5,249,830 | 10/1993 | Calmettes et al. . |
| 5,257,833 | 11/1993 | McNaughton et al. . |
| 5,316,350 | 5/1994 | Kollenbrandt et al. . |
| 5,375,507 | 12/1994 | Kladiwa et al. ........................ 92/169.1 |

Primary Examiner—Thomas E. Denion
Attorney, Agent, or Firm—Taylor & Knuth

[57] ABSTRACT

An end cap assembly for a fluid cylinder is disclosed. The assembly includes a pair of end caps comprising closure units closing the open ends of a cylindrical casing. Each closure unit has an axially extending annular skirt having an outer cylindrical surface telescope within an open end of the casing. The annular skirt has an annular barb radially projecting from its outer cylindrical surface. The inside cylindrical surface of the casing has an annular groove which receives the annular barb to axially retain the skirt within the open end of the casing. A retaining ring is provided within the annular skirt to radially urge the barb into interlocking engagement with the annular groove.

16 Claims, 2 Drawing Sheets

5,465,647

FLUID CYLINDER END CAP ASSEMBLY

BACKGROUND OF THE INVENTION

This invention relates to single and double-acting fluid cylinders and, more particularly, to a technique for securely retaining the end closure units at the ends of a cylindrical piston casing.

Various techniques are employed to attach the end caps of power cylinders to the cylindrical piston casing. No particular problems are encountered when the elements of the power cylinder are metallic since conventional threading, swaging, and welding techniques may be employed. In many instances, however, it is desirable to construct fluid power cylinders out of plastic materials in applications where strength-to-weight ratios are important considerations and in corrosive environments. Conventional techniques employed in the assembly of metallic cylinders do not apply to plastics. It is also desirable to construct fluid power cylinders that are disposable rather than repairable since unskilled personnel may improperly replace fluid seals with disastrous consequences when the cylinder is put back into service.

BRIEF DESCRIPTION OF THE INVENTION

This invention provides a fluid power cylinder having an end cap assembly for a cylindrical casing. The end cap assembly includes a pair of end caps, at least one of which comprises a closure unit having an axially-extending, cup-shaped annular skirt. The annular skirt has an outer cylindrical surface which is telescoped within an open end of the casing and has an annular barb on its outer cylindrical surface. The casing has an inside cylindrical surface which is provided with an annular groove which receives the annular barb to axially retain the annular skirt within the open end of the casing. A retaining ring is provided within the cup-shaped annular skirt and is retained therein by an interference fit to radially urge the barb into interlocking engagement with the annular groove.

The power cylinder is assembled by first inserting a piston in its slidable position within the casing. The piston may be associated with a single rod or a double rod in the case of a double-acting piston. The cup-shaped annular skirt portion of each closure unit is then telescoped within the open ends of the casing until the annular barbs snap into the annular groove at the ends of the casing. One or more of the closure units may have a bore for receiving the piston rod, or one unit may have such a bore while the other unit may be provided with a clevis for pivotally mounting the power cylinder. With the end caps in place, the piston is actuated to drive the retaining ring within the cup-shaped annular skirt. The retaining ring may have a first outer cylindrical surface which has a diameter exceeding the diameter of the inside surface of the annular skirt, and a second outer cylindrical surface having a diameter less than the diameter of the inside surface of the annular skirt. With such an arrangement, the small diameter portion of the retaining ring may be initially positioned within the annular skirt prior to seating the remaining portion of the ring in the skirt by the piston. Once the retaining rings are properly seated, the power cylinder is ready for normal operations.

According to this invention, the assembly may be constructed substantially entirely from suitable resins. For example, the casings may be produced by filament winding techniques employing an epoxy matrix material with a five percent polytetrafluoroethelene filling. The winding mandrel may be pre-wet with a gel coat to ensure inner surface smoothness, and the first pass on the mandrel may be level wound. Alternately, the casing may be done by known pultrusion techniques. The end casings and the piston head may be made by injection molding, and the piston rod may be pultruded. If necessary, a stainless steel thread insert may be provided to increase shear strength of the thread.

According to this invention, the power cylinder cannot be disassembled without totally destroying the cylinder. Moreover, the unit is chemically resistant to corrosive chemicals so that the unit may be used in hostile environments.

DETAILED DESCRIPTION OF THE INVENTION

Figure 1:
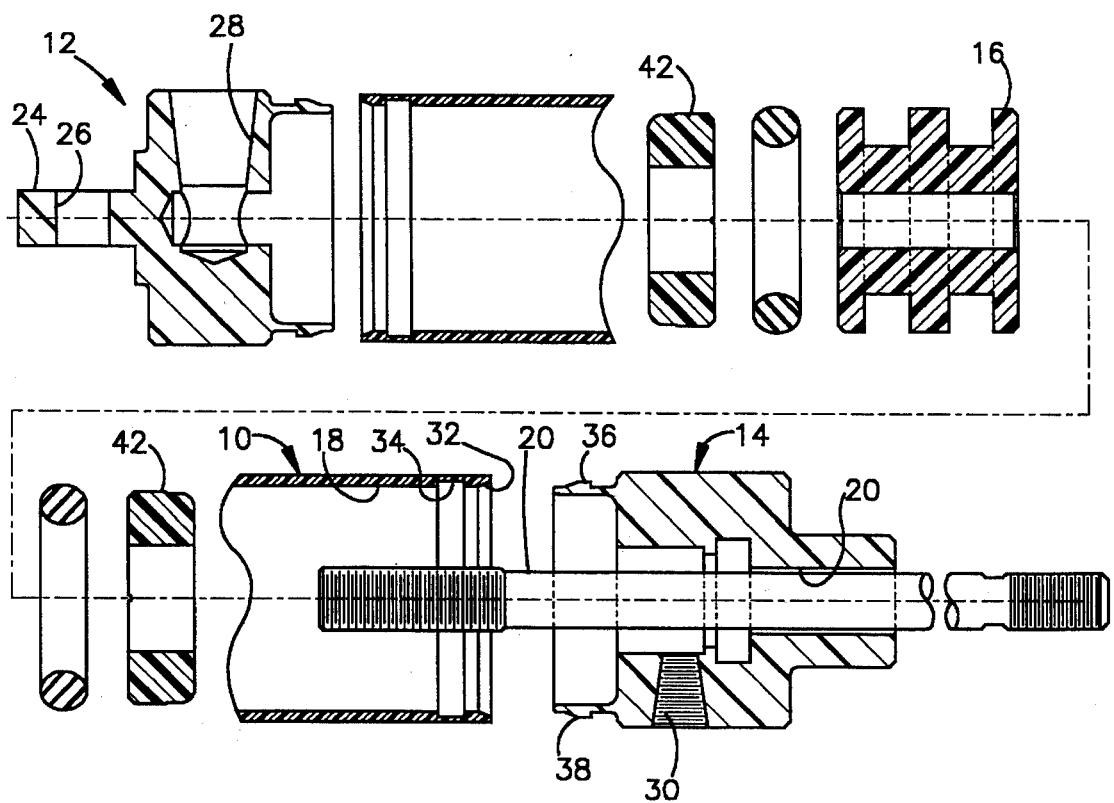
FIG. 1 is an exploded cross-sectional elevational view of an end cap assembly for a double acting fluid cylinder according to this invention.

An end cap assembly according to this invention comprises a cylindrical casing 10 closed at its ends by a pair of closure units 12 and 14. A piston 16 is slidably mounted within an inside cylindrical surface 18 of the casing 10 and has an axially-projecting piston rod 20 which slidably extends through a bore 22 in the closure unit 14. The other closure unit 12 has a projecting lug 24 having a transverse bore 26 adapted to be pivotally connected to a mounting pin. Air inlet and outlet ports 28 and 30 are provided in the closure units 12 and 14 to reciprocate the piston head 16 and its rod 20 relative to the casing 10.

The casing 10 is preferably a fiber-reinforced plastic composite which may be fabricated by filament winding a glass reinforcing roving on a pre-wetted mandrel with at least one level wound pass so that the pre-wetted mandrel will exhibit a gel coat on the inner surface of the cured composite. The resin matrix may be a five percent polytetrafluoroethelene filled epoxy. Alternately, the casing may be a pultruded tube which is manufactured according to known pultrusion techniques. In the case of a pultruded casing, vinyl ester may be employed as the matrix resin. The closure units 12 and 14 may be injection-molded from acetal resin or COMALLOY E-13370 B . The piston rod may be made from 303 stainless steel or may be a pultruded composite. In the case of a pultruded rod, a threaded connection between the rod and the piston may be metallic, threaded inserts to increase the shear strength of the threads, if necessary.

Each end of the casing 10 has a conically beveled edge surface 32 and an annular groove 34. Each closure unit 12 and 14 has an axially-extending, cup-shaped annular skirt 36 having an annular barb 38 radially projecting from an outer cylindrical surface 40 of the skirt 36. The barb 38 is received within and interlocked with the annular groove 34, and a retaining ring 42 is positioned within an inside cylindrical surface 44 of the skirt 36 to provide added support so the barb 38 will not tend to back off under continuous stress. For reasons which will become apparent, the retaining ring 42 has a first outer cylindrical surface 46 which, in an uncompressed condition (see FIG. 2), is greater than the diameter of the inside surface 44 of the annular skirt 36. The retaining ring 42 has a second outer cylindrical surface 48 having a diameter which does not exceed the diameter of the inside cylindrical surface 44 of the skirt 36.

A closure unit is assembled on an end of a pressure casing 10 by initially positioning the piston 16 and its rod 20 in the casing. A pair of retaining rings 42 are positioned in the casing so that the piston head 16 is positioned between the rings 42 and so that the second cylindrical surface 48 of each retaining ring is positioned toward the open end of the casing 10. With these elements in place, the closure units 12 and 14 are attached to the casing by telescoping the annular skirt 36 into an open end of the casing 10 until the barb 38 seats within the annular groove 34. The conical surface 32 assists in this operation since the barb 38 is cammed inwardly along the surface 32 and then into the groove 34. As may be appreciated, a force of between five-hundred and one-thousand pounds is required for this operation. After the closure units 12 and 14 are assembled in this manner, the backing rings 42 are forced within the cup-shaped skirt by actuating the piston. It may be noted that the second cylindrical surface 48 has a diameter which forms a clearance fit with the surface 44 to act as a pilot for the backing ring 42. The first cylindrical surface, on the other hand, forms an interference fit with respect to the surface 44 so that the skirt 36 is radially compressed as the retaining ring is completely driven into the cup-shaped skirt 36. The piston is actuated in its normal manner by alternately admitting and exhausting air from the ports to perform this seating operation. After the first cycle of the piston, the power cylinder is in condition for normal service operation.

With the piston assembled in this manner, it may be noted that it is virtually impossible to disassemble the unit without destroying the connection between the casing and the closure units.

Figure 2:
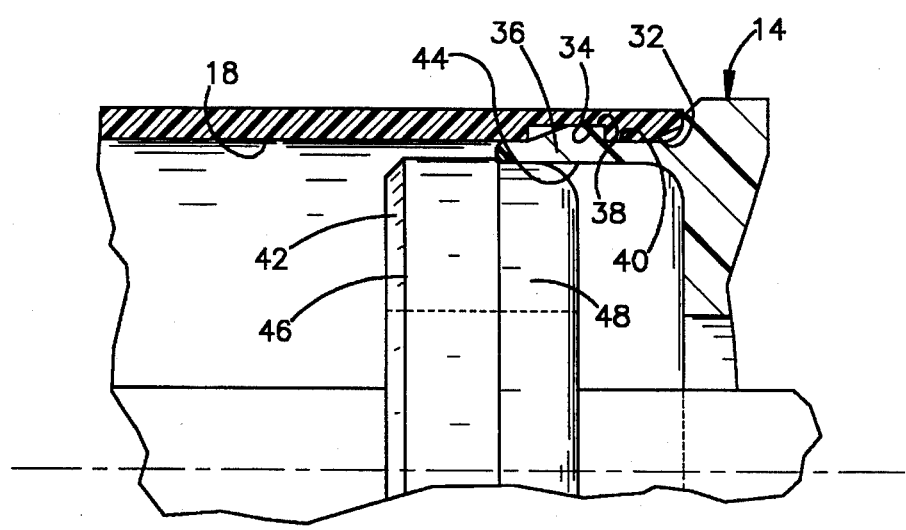
FIG. 2 is a cross-sectional view of the rod end cap illustrating a step in the assembly of that end cap to the casing.
Figure 3:
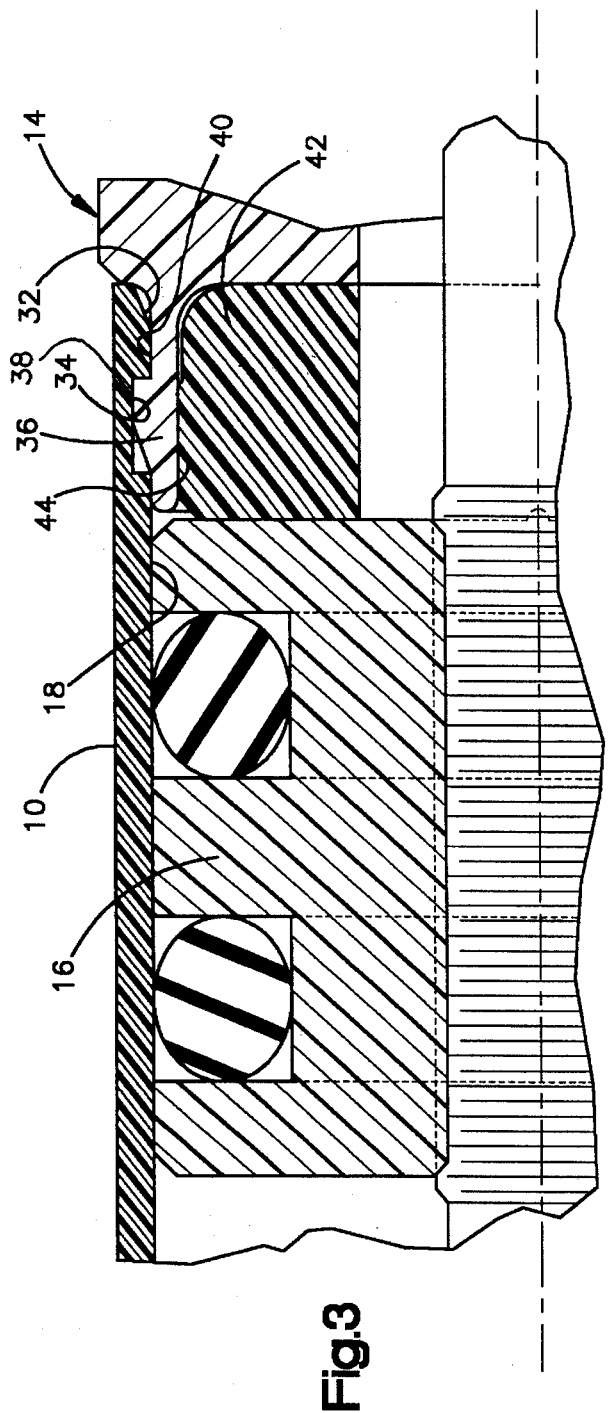
FIG. 3 is a cross-sectional view illustrating the completion of the assembly step illustrated in FIG. 2.
Figure 4:
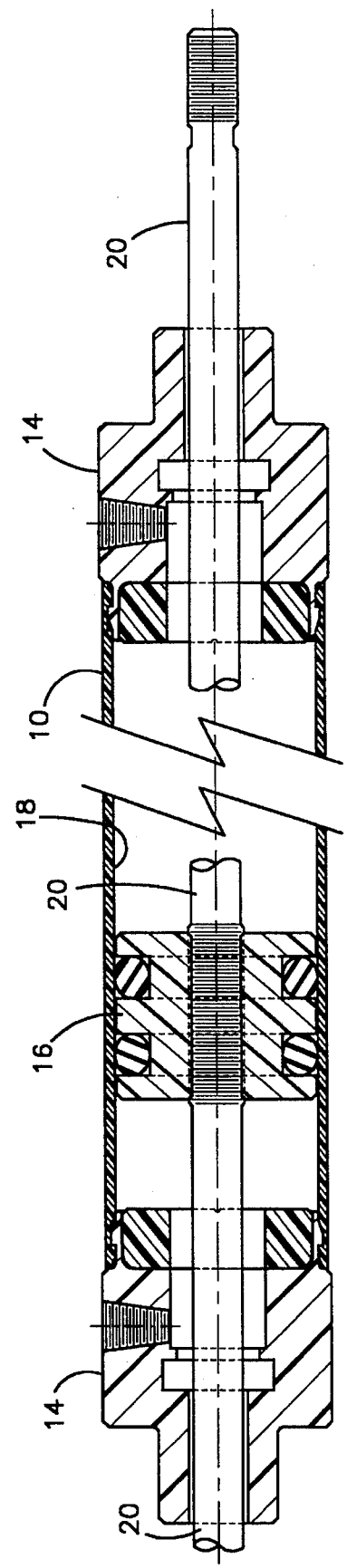
FIG. 4 is a cross-sectional elevational view of an end cap assembly for a double acting, double rod end mount, fluid cylinder.

The cylinder illustrated in FIG. 4 is generally similar to the cylinder illustrated in FIGS. 1–3. In FIG. 4 the power cylinder has a double rod 20 and the closure unit 14 is provided at both ends of the casing 10 for receiving the double rod 20. In other respects the components and assembly technique are the same.

Although the preferred embodiments of this invention have been shown and described, it should be understood that various modifications and rearrangements of the parts may be resorted to without departing from the scope of the invention as disclosed and claimed herein.

What is claimed is:

1. An end cap assembly for a fluid cylinder comprising a cylindrical casing having open ends, a pair of end caps closing the open ends of said cylindrical casing, at least one of said end caps comprising a closure unit having an axially-extending, cup-shaped annular skirt having an outer cylindrical surface telescoped within an open end of said casing, said annular skirt having an annular barb radially projecting from said outer cylindrical surface, said casing having an inside cylindrical surface having an annular groove which receives said annular barb to axially retain said annular skirt within said open end, and a retaining ring within said cup-shaped annular skirt providing an interference fit with an inside cylindrical surface of said skirt to radially urge said barb into interlocking engagement with said annular groove.

2. An end cap assembly according to claim 1, wherein said barb includes a conical ramp portion extending from a cylindrical outer periphery portion of said barb toward an end edge of said skirt.

3. An end cap assembly according to claim 2, wherein said open end of said cylindrical casing includes a conical guide portion extending from an interior cylindrical surface portion of said casing toward said open end of said casing.

4. An end cap assembly according to claim 2, wherein said retaining ring has a first outer cylindrical surface providing said interference fit and being in radial alignment with said barb and a second cylindrical surface having a diameter which does not exceed said inside cylindrical surface of said skirt, said second cylindrical surface being in radial alignment with said conical guide portion and said inside cylindrical surface portion of said casing.

5. An end cap assembly according to claim 1, wherein said casing, said annular skirt and said retaining ring are plastic.

6. An end cap assembly according to claim 5, wherein said plastic is polytetrafluoroethelene.

7. An end cap assembly according to claim 5, wherein said plastic is vinyl ester.

8. An end cap assembly according to claim 5, wherein said plastic is acetal.

9. An end cap assembly for a fluid cylinder according to claim 1, wherein said closure unit closes both said open ends of said cylindrical casing.

10. An end cap assembly according to claim 9, wherein at least one said closure unit is provided with an axial bore, wherein a piston rod extends through said bore and wherein a piston head is mounted on said rod for reciprocation within said casing.

11. An end cap assembly according to claim 10, wherein each said closure unit is provided with an axial bore and said piston rod extends through each bore.

12. An end cap assembly according to claim 10, wherein one said closure unit is provided with an axial bore and another one said closure unit is provided with a clevis.

13. A method of assembling an end cap on an open end of a tubular pressure cylinder comprising the steps of providing a cylindrical casing having an open end, providing a closure unit for said open end, said closure unit having an axially-extending, cup-shaped annular skirt having an outer cylindrical surface, said annular skirt having an annular barb radially projecting from said outer cylindrical surface, said casing having an inside cylindrical surface having an annular groove adjacent said open end which is adapted to receive said annular barb, positioning a retaining ring within said cylinder, said retaining ring having an outside diameter adapted to form an interference fit with an inside cylindrical surface of said skirt, positioning a piston head within said inside cylindrical surface of said cylinder so that said retaining ring is positioned between said piston head and said one of said open ends, telescoping said annular skirt into said open end of said cylindrical casing until said annular barb seats within said annular groove, and driving said piston head against said retaining ring to force said retaining ring along said inside cylindrical surface of said annular skirt and to seat said retaining ring within said cup-shaped annular skirt with an interference fit.

14. A method according to claim 13, wherein said retaining ring has a first outer cylindrical surface having a diameter exceeding the diameter of said inside surface of said annular skirt and has a second outer cylindrical surface having a diameter less than the diameter of said inside surface of said annular skirt so that a portion of said ring is positioned in said annular skirt prior to seating a remaining portion of said ring in said skirt.

15. A method of assembling end caps on open ends of a tubular pressure cylinder comprising the steps of providing a cylindrical casing having open ends, providing a closure unit for each of said open ends, each said closure unit having an axially-extending, cup-shaped annular skirt having an outer cylindrical surface, each annular skirt having an annular barb radially projecting from said outer cylindrical surface, said casing having an inside surface having an annular groove adjacent each open end which is adapted to receive an annular barb, positioning a piston head within said inside cylindrical surface of said cylinder, positioning a pair of retaining rings in said casing so that said piston head is positioned between said rings, each of said retaining rings having an outside diameter adapted to form an interference fit with an inside cylindrical surface of said skirt, telescoping the annular skirt of each closure unit into the open ends of the casing until each annular barb seats within each annular groove, and driving said piston head alternately against each retaining ring to force each retaining ring along said inside cylindrical surface of said annular skirt and to seat each retaining ring within each cup-shaped annular skirt with an interference fit.

16. A method according to claim 15, wherein each retaining ring has a first outer cylindrical surface having a diameter exceeding the diameter of said inside surface of each said annular skirt and has a second outer cylindrical surface having a diameter less than the diameter of said inside surface of each said annular skirt so that a portion of each ring is positioned in each said annular skirt prior to seating a remaining portion of said ring in said skirt.

* * * * *